United States Patent [19]

Ohm

[11] 3,768,039

[45] Oct. 23, 1973

[54] FREQUENCY SELECTIVE POLARIZATION INSENSITIVE BRANCHING NETWORK

[75] Inventor: Edward Allen Ohm, Holmdel, N.J.

[73] Assignee: Bell Telephone Laboratories, Incorporated, Murray Hill, N.J.

[22] Filed: Sept. 9, 1971

[21] Appl. No.: 179,099

[52] U.S. Cl. ............. 333/6, 333/21 A, 343/100 PE, 343/850

[51] Int. Cl. ........................... H01p 1/16, H01p 5/12

[58] Field of Search ........................ 333/6, 11, 21 A; 343/100 PE, 756, 850

[56] References Cited

UNITED STATES PATENTS 3,267,477 8/1966 Brickey .............................. 343/756

3,540,045 11/1970 Taylor ...................... 343/100 PE X

*Primary Examiner*—Paul L. Gensler

*Attorney*—R. J. Guenther et al.

[57] ABSTRACT

A frequency selective polarization insensitive branching network which couples arbitrarily polarized waves of different frequencies from a common wave energy path to different output wave energy paths and vice versa. The network comprises a combination of known microwave devices which are arranged such that they cooperate to couple energy in the aforesaid manner.

15 Claims, 3 Drawing Figures

FREQUENCY SELECTIVE POLARIZATION INSENSITIVE BRANCHING NETWORK

BACKGROUND OF THE INVENTION

This invention relates to satellite communications systems and, in particular, to microwave branching networks to be used in such systems.

As is well known, in satellite communications systems, the signals propagating between the satellite and ground station must necessarily pass through the ionosphere. As is also well known, the latter medium has the affect of rotating the polarizations of waves propagating therethrough. This rotation phenomena is generally referred to as Faraday rotation. The amount of Faraday rotation experienced by a given wave is dependent upon the frequency of the wave. Generally, waves of different frequencies experience different amounts of rotation. Moreover, the amount of Faraday rotation received by waves of a particular frequency may change with day to day variations in atmospheric conditions.

Thus, as a result of their traversal through the ionosphere, the signals transmitted and received by a satellite system ground station are rotated in polarization. Additionally, since the received and transmitted signals are typically at different widely spaced frequencies, each is rotated a different amount. Since the latter rotation causes the polarizations of the received waves to be misaligned with respect to the poles of the receivers, degradation of system performance results. Moreover, if the received and transmitted signals each comprise orthogonal polarizations, as is generally the case, the situation is further aggravated, since the rotation of each pair of orthogonal polarizations has the undesirous effect of generating crosstalk at the receivers.

One prior art proposal for compensating for the aforementioned undesirous effects of Faraday rotation involves the physical rotation of the ground station antenna. When transmitting, the antenna is rotated such that the subsequent Faraday rotation of the transmitted signal is substantially compensated for. Similarly, when receiving signals, the antenna is rotated to substantially cancel the Faraday rotation already experienced by the waves during transmission.

While the aforesaid method of rotating the ground station antenna offers a solution to the problem of Faraday rotation, it is not an entirely satisfactory one because it is extremely complex and it requires the use of precise gear mechanisms to provide the proper antenna rotation. Moreover, such a method cannot be used to provide compensation for both the received and transmitted signals simultaneously.

It has been recognized that the effects of Faraday rotation can be substantially counteracted by the use of conventional polarization rotators. Since a single rotator can controllably rotate waves of substantially a single frequency, two polarization rotators, one to rotate the received waves and the other the transmitted waves, are required. Passage of both the received and transmitted waves through both rotators, however, would be undesirous, since the rotator for the received waves would have an adverse effect on the transmitted waves and, similarly, the rotator for the transmitted waves would have an adverse affect upon the received waves. The transmitted and received waves should, therefore, transverse their respective rotators along different wave energy paths. Since a single antenna is used at the ground station, however, the received and transmitted waves must also propagate along a common wave energy path which leads to the antenna. As a result of the latter two requirements, a branching network is needed for branching the received signal between the common wave energy path and the wave path associated with its rotator and for branching the transmitted signal between the common wave energy path and the wave path associated with its rotator.

Conventional branching networks for branching different frequency waves in the above-described manner, typically, are polarization sensitive. Generally such devices fall into two broad classes. The first class of devices is operative only in cases where the different frequency waves are orthogonally polarized relative to one another, while the other class of devices is operative only in situations where the waves are collinerally polarized relative to one another. In the present situation, however, due to Faraday rotation, the received and transmitted waves are not collineraly polarized or orthogonally polarized but in fact, may be arbitrarily polarized. Thus, conventional polarization sensitive branching networks cannot be employed to provide the needed branching function.

It is therefore a broad object of the present invention to provide a frequency selective branching network which is insensitive to the polarizations of the waves to be branches.

It is another object of the present invention to provide a branching network for use in a Faraday rotation compensating system.

SUMMARY OF THE INVENTION

In accordance with the principles of the present invention, the above and other objectives are accomplished by a reciprocal network of known microwave devices which cooperate to couple arbitrarily polarized waves having different frequencies between a common wavepath and different signal wavepaths.

In general, this network includes means for resolving any applied signal, whether a multi-frequency signal entering the network via the common wavepath or a single frequency signal entering the network via one of the signal wavepaths, regardless of polarization, into two orthogonally polarized component signals. Each orthogonal component signal thus comprises each frequency contained in the original applied signal. Where the applied signal comprises two different frequencies, the frequency processing function of the network then operates upon each orthogonal component separately, to separate the different frequencies included therein. The separated frequencies are then recombined to produce two waves, one at each of the separate frequencies, which exit the network via different signal paths. Conversely, if the two single frequency waves enter the network via different signal paths, the network frequency processing function again operates upon the orthogonal components separately. In this case, each orthogonal component of the first frequency signal is combined with one of the orthogonal components of the second frequency signal. The combined frequency waves are then themselves combined to result in a composite signal comprising the two different frequencies which exits the network via the common wavepath. The result is a network having a reciprocal path therethrough for each of the applied signal frequencies between the common path and a different one of the signal paths. Each reciprocal path, in turn, includes separate paths for the orthogonal components of the applied frequency associated therewith.

In terms of specific microwave hardware, the aforesaid network includes an ultrawideband polarization coupler which receives each of the waves traversing the common wavepath and couples the component of each wave polarized in a first direction to a first wave energy path and the component of each wave polarized in a second direction, orthogonal to the first direction, to a second wave energy path.

Disposed along the first and second wave paths are corresponding first and second pluralities of frequency selective branching networks. These networks selectively branch the component waves traversing their respective paths to a plurality of polarization couplers. In particular, each first network and its corresponding second network branch wave components of the same frequency traversing their respective paths to the same coupler, while different corresponding first and second networks branch component waves of different frequencies to different couplers. Each coupler, therefore, receives the two component waves of a different one of the composite waves originally introduced into the network from the common wavepath. Each of the couplers, in turn, couples its two received component waves to a different one of the signal paths. By assuring that the two component waves arriving at a particular coupler have traversed the same distance, each of these component wave pairs, when coupled to its respective signal path, combine to form their original composite wave. Thus, waves at different frequencies have been coupled by the network from a common path to different signal paths.

Since waves of the same frequency having different polarizations are similarly divided into components polarized along the first and second directions, the components of each of these waves transverse the network in the same manner and, thus, arrive at the same signal path. Hence, the network is truly insensitive to the polarization of waves introduced thereto.

Additionally, the ultrawideband coupler, frequency selective branching networks and polarization couplers are all reciprocal devices. Thus, waves of a given frequency coupled to a specific signal wavepath by the network, if introduced into the network along this path will be coupled out of the network via the common wavepath.

When used to provide the branching function in an arrangement for compensating for Faraday rotation, the present branching network is disposed such that it branches the received waves from the common wave path leading to the antenna to a first output path and such that it couples the transmitted waves from a second output path to the common path. A rotator along the first path pre-rotates the received waves prior to introduction into the network such that the subsequent Faraday rotation experienced by these waves during transmission is substantially cancelled. A second rotator disposed along the second path similarly rotates the received waves coupled thereto by the branching network such that the Faraday rotation previously experienced by these waves is substantially cancelled.

BRIEF DESCRIPTION OF THE DRAWING

A clearer understanding of the above-mentioned objectives and features of the present invention can be obtained by reference to the following detailed description taken in conjunction with the accompanying drawings in which.

DETAILED DESCRIPTION

Figure 1:
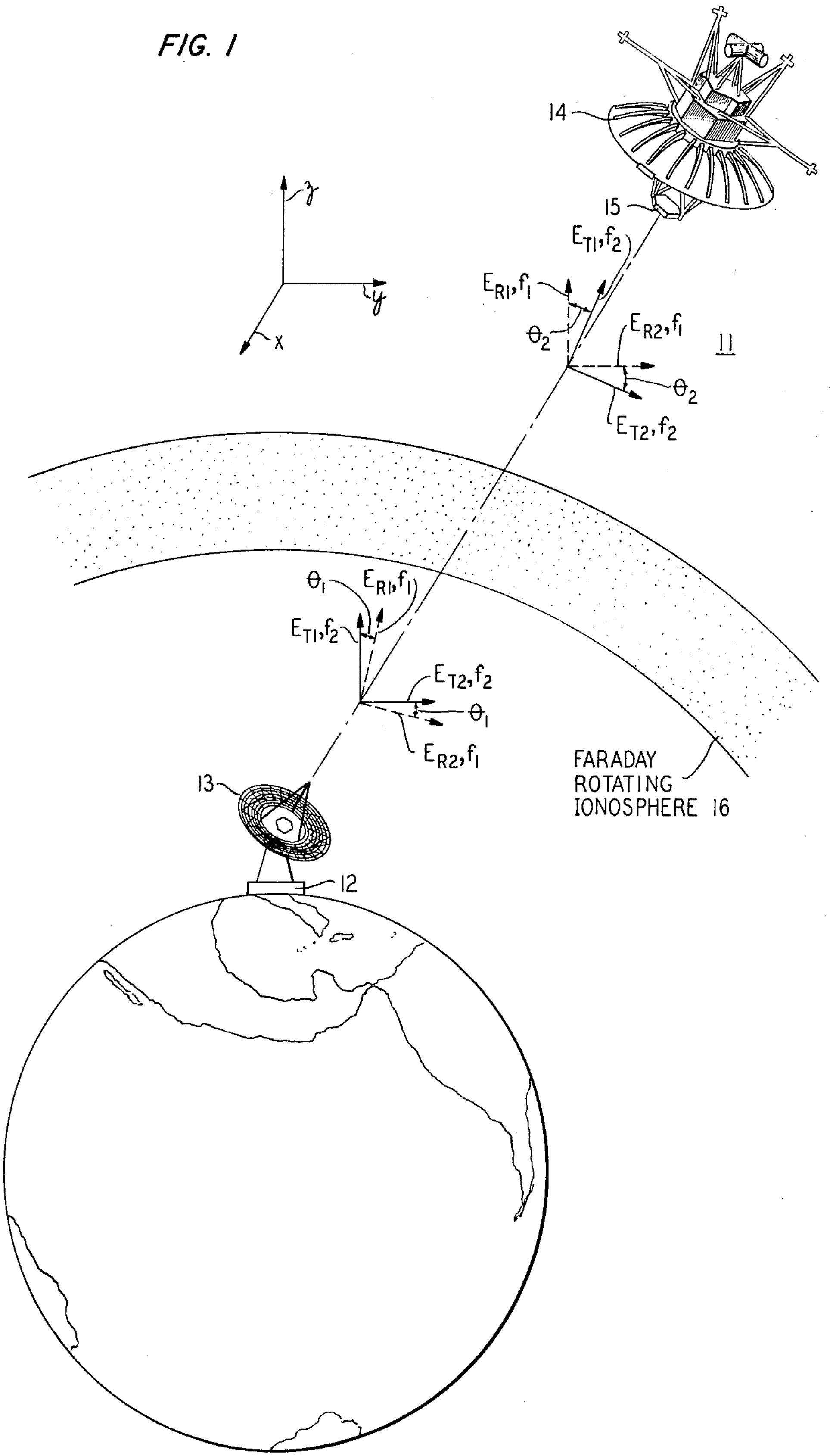
FIG. 1 illustrates a satellite communications system wherein the ground station receives and transmits signals which transverse a Faraday rotating ionosphere.
Figure 2:
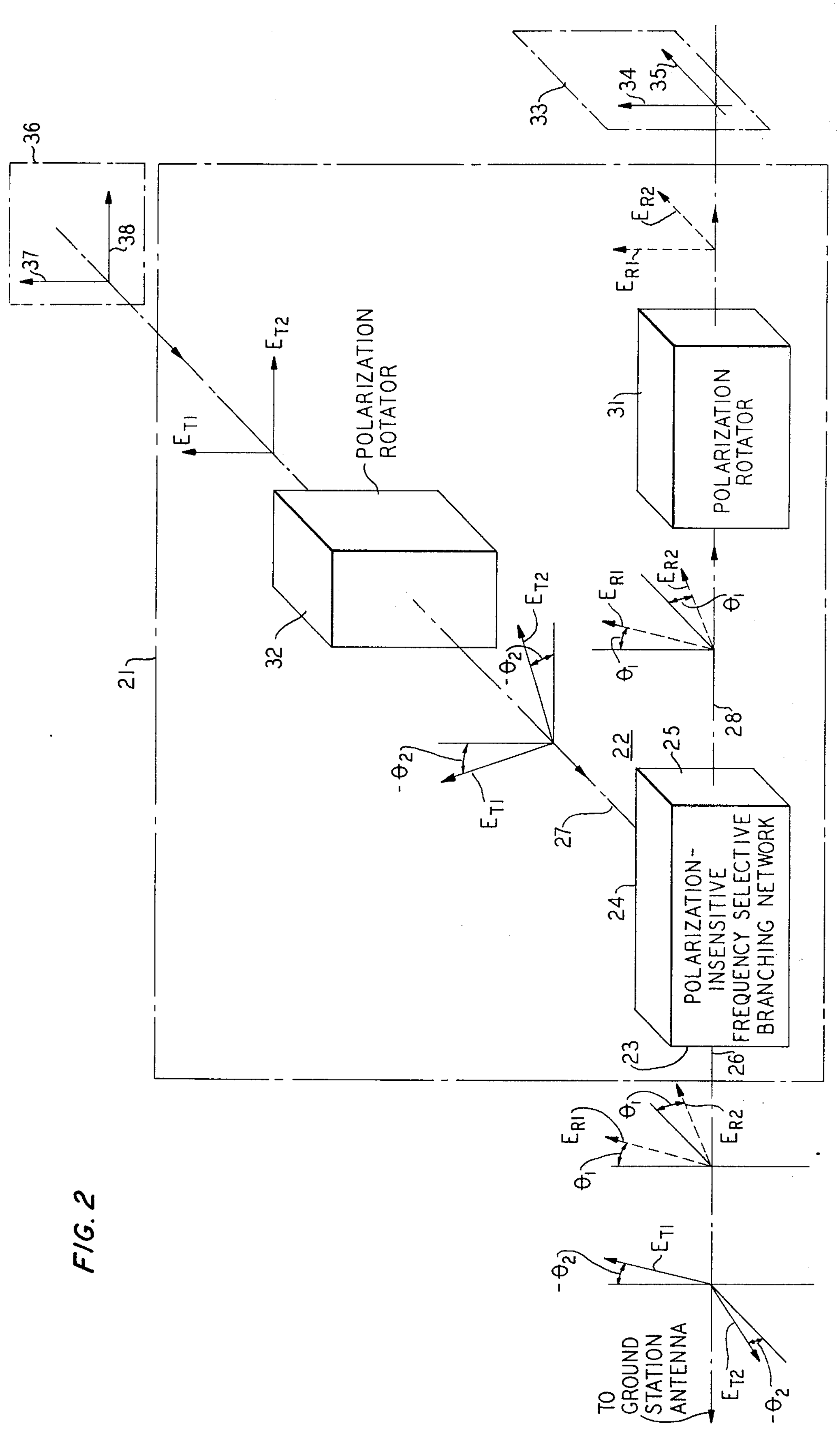
FIG. 2 shows a feed system for compensating for the Faraday rotation experienced by the received and transmitted signals of FIG. 1 which employs a polarization insensitive frequency selective branching network, in accordance with the principles of the present invention.

Prior to entering upon a detailed discussion of a branching network, in accordance with the present invention, FIGS. 1 and 2 are present to illustrate, respectively, a typical satellite communications system suffering from the ill effects of Faraday rotation and an antenna feed system, utilizing a branching network, in accordance with the invention, for curing such ill effects.

As shown in FIG. 1, ground station 12 of satellite communications system 11 receives two orthogonally polarized waves at a frequency $f_1$, and transmits two orthogonally polarized waves at a frequency $f_2$. Typically, $f_1$ and $f_2$ might lie within the 4 and 6 GHz common carrier bands, respectively. Each of the aforesaid waves is represented in FIG. 1 by an electric field vector E. The two received electric fields are designated by the subscript R, while the two transmitted electric fields are designated by the subscript T. Also, the subscripts 1 and 2 are used to differentiate the two received fields as well as the two transmitted fields.

The received polarizations of $E_{R1}$ and $E_{R2}$ are transmitted to ground station 12 via antenna system 15 of satellite 14. When transmitted from the satellite $E_{R1}$ and $E_{R2}$ and polarized in directions parallel to the $z$ and $y$ directions, respectively, of reference coordinate systems $x$, $y$ and 2. The transmitted polarizations $E_{T1}$ and $E_{T2}$ are transmitted, via antenna 13, to satellite 14 polarized in directions which are also parallel to the $z$ and $y$ coordinate directions, respectively.

In transmission from satellite to ground and vice versa, the waves $E_{T1}$, $E_{T2}$, $E_{R1}$, and $E_{R2}$ propagate through a Faraday rotating ionosphere 16 which causes the polarization of each wave to be rotated through an angle which is dependent upon the frequency of the wave. As shown, the $E_{R1}$ and $E_{R2}$ waves experience an angular rotation $+\theta_1$ relative to their original polarization directions. Waves $E_{T1}$ and $E_{T2}$, on the other hand, are rotated through an angle $+\theta_2$ relative to their initial polarizations.

Due to the aforesaid rotation of the $E_{R1}$ and $E_{R2}$ polarizations, these polarizations are no longer in alignment with the receiver poles (not shown) at ground station 12. As a result, unwanted crosstalk between the channels corresponding to the $E_{R1}$ and $E_{R2}$ polarizations will be generated at the ground station receiver. Analagously, the rotated polarizations $E_{T1}$ and $E_{T2}$ are no longer aligned to the receiver poles (not shown) of satellite 14 and, thus, crosstalk is similarly generated at this receiver.

To prevent the occurrence of the aforesaid unwanted crosstalk, an antenna feed system 21, illustrated pictorially in FIG. 2, is employed to rotate the polarizations of the received waves through an angle $-\theta_1$, prior to feeding these waves to the receiver at the ground station, and to rotate the polarizations of the transmitted waves through an angle $-\theta_2$ prior to feeding the latter waves to antenna 13. Feed system 21 accomplishes these ends, in part, through the use of a frequency selective polarization insensitive branching network 22, which will be described in greater detail hereinbelow.

It should be noted, however, at this point in the discussion, that in accordance with the principles of the present invention, network 22 has a unique coupling or branching characteristic which is frequency sensitive, but polarization insensitive. In particular, waves of different frequencies applied to the network along a common input wave energy path are coupled therefrom by the network to different output wave energy paths. Waves of the same frequency, moreover, are coupled to the same output path regardless of their polarizations. Additionally, the aforesaid coupling characteristic is reciprocal in nature. Thus, waves of a given frequency coupled from the common path to a specific output path, if applied to the latter output path will be coupled by the network back to the common path. When operating in this reciprocal manner the output paths function as input paths and the common input path functions as an output path.

In the illustrative example of FIG. 2, network 22 provides coupling between common wave energy path 26 and wave energy path 28 for arbitrarily polarized waves of frequency $f_1$ and coupling between path 26 and wave energy path 27 for waves of frequency $f_2$.

Feed system 21 additionally comprises two polarization rotators 31 and 32. The latter rotator is situated along path 27 opposite port 24 of network 22, while the former rotator is situated along path 28 opposite port 25 of network 22. Each rotator rotates energy of a specified frequency passing therethrough through a predetermined angle. Rotator 31, on the one hand, rotates energy of frequency $f_1$ through an angle $-\theta_1$. Rotator 32, on the other hand, rotates energy of frequency $f_2$ through an angle $-\theta_2$.

In operation, the received waves $E_{R1}$ and $E_{R2}$ are coupled from the ground station antenna into feed system 21 through port 23 of network 22. Since these waves are at a frequency $f_1$, they depart network 22 via port 25 and are coupled to polarization rotator 31. In passing through rotator 31, each polarization is rotated through an angle $-\theta_1$. As a result, $E_{R1}$ and $E_{R2}$ leave the rotator in proper alignment with the poles of ground station receiver 33, which are indicated by vectors 34 and 35. The transmitted polarizations $E_{T1}$ and $E_{T2}$, are coupled from a ground station transmitter 36 having orthogonal poles 37 and 38 to rotator 32 of feed system 21. The rotator rotates each polarization through an angle $-\theta_2$ and couples the rotated polarizations to port 27 of network 22. Since these waves are at a frequency $f_2$, they depart the network via port 23 and are coupled therefrom to ground station antenna 13 for transmission. Having been rotated through an angle $-\theta_2$ by feed system 21, the subsequent $+\theta_2$ rotation of $E_{T1}$ and $E_{T2}$ during transmission causes these waves to arrive at satellite 14 in alignment with the poles of the satellite receiver.

As indicated hereinabove, frequency selective polarization insensitive branching network 22 operates to branch arbitrarily polarized waves at a frequency $f_1$ (i.e., the received waves) between wave path 26 and wave path 28 and arbitrarily polarized waves at a frequency $f_2$ (i.e., the transmitted waves) between wave path 26 and wave path 27. A structural embodiment of a network capable of providing such branching is illustrated in FIG. 3.

Figure 3:
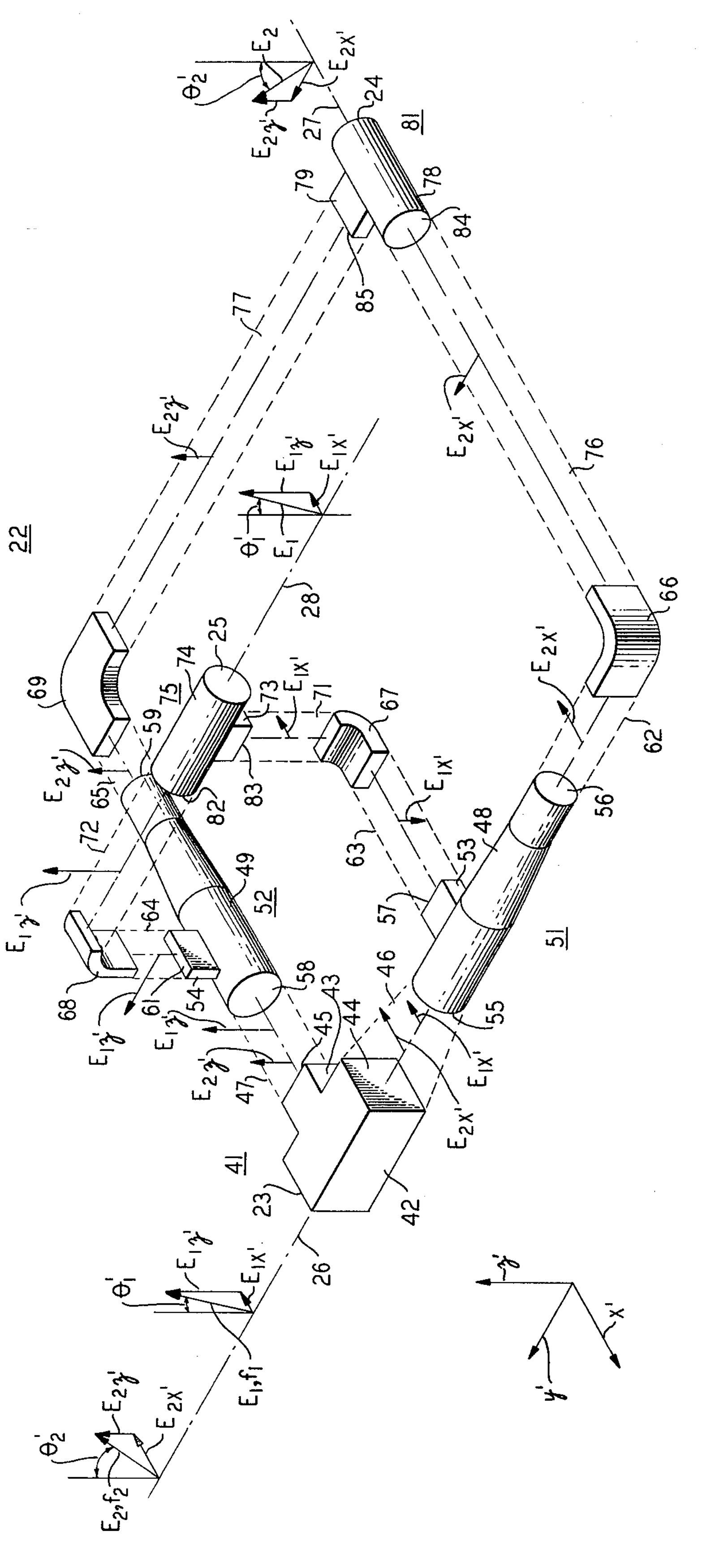
FIG. 3 is a more detailed illustration of a polarization insensitive frequency selective branching network, in accordance with the principles of the present invention.

As shown in FIG. 3, frequency selective polarization insensitive branching network 22 includes an ultrawideband polarization coupler 41 which is capable of providing coupling for waves at both the received and transmitted frequencies. Coupler 41 comprises a main waveguide section 42 whose axis lies along the $y'$ coordinate direction of reference coordinate system $x'$, $y'$ and $z'$. Joined to guide 42 such that its axis is in the $x'$ direction is auxiliary guide section 43 of coupler 41.

Energy can be introduced into coupler 41 through ports 23 and 44 of section 42 and through port 45 of section 43. Port 23, as previously indicated, serves as one of the energy coupling ports of network 22. As shown, it couples energy to the network from common wave energy path 26 and vice versa. The coupling characteristic of coupler 41 can be described in terms of energy introduced into the ports 23, 44 and 45. In particular, waves entering port 23 polarized in the $x'$ and $z'$ directions are coupled to ports 44 and 45 respectively; conversely, waves entering port 44 polarized in the $x'$ direction and waves entering port 45 polarized in the $z'$ direction are coupled to port 23. A polarization coupler exhibiting the aforesaid coupling characteristic over an ultrawideband is disclosed in my copending application, Ser. No. 141,581, filed on May 10, 1971.

Transition waveguide sections 46 and 47, shown in dotted line, join guides 42 and 43 to main waveguide sections 48 and 49, respectively, of frequency selective branching networks 51 and 52, respectively. The latter networks additionally include auxiliary waveguide sections 53 and 54 which are coupled to main guides 48 and 49, respectively. As shown, auxiliary guide 53 is connected to its respective main guide such that the axis of guide 53 is parallel to the $x'$ direction. The connection of guide 54, on the other hand, is made such that its axis is parallel to the $z'$ direction.

Energy can enter branching network 51 through ports 55 and 56 of main guide 48 and through port 57 of auxiliary guide 53. Similarly, energy can be introduced into network 52 through ports 58 and 59 of main guide 49 and through port 61 of auxiliary guide 54. Networks 51 and 52 have similar reciprocal branching or coupling characteristics with respect to energy entering their ports. More specifically, energy at the frequency $f_1$, which is polarized parallel to the auxiliary guide axis and which is coupled to the network from coupler 41 is rotated 90° in polarization, reflected and directed through the auxiliary guide. All other energy passes straight through the main guide of the network. Thus, with respect to network 51, energy at the frequency $f_1$, which enters port 55 polarized in the $x'$ direction, is coupled out of the network, via port 57, polarized in the $z'$ direction. On the other hand, energy at the frequency $f_1$ polarized in the $z'$ direction, which enters port 58 of network 52, is coupled therefrom via port 61, polarized in $y'$ direction. All other energy entering ports 55 and 58 is directed to ports 56 and 59 respectively, of networks 51 and 52. Networks suitable for use as networks 51 and 52 are disclosed in U.S. Pat. No. 2,972,722, issued on Feb. 1, 1961 to the applicant hereof.

Transition waveguide sections 62, 63, 64 and 65, shown in dotted line, connect waveguides 48, 53, 54 and 49 to waveguide bend sections 66, 67, 68 and 69 respectively. Waveguide bends 67 and 68, in turn, are coupled through transition waveguide sections 71 and 72, also shown in dotted line, to waveguide sections 73 and 74, respectively. The latter two guides from the auxiliary guide and main guide sections of a polarization coupler 75. Similarly, waveguide bends 66 and 69 are coupled through transition waveguide sections 76 and 77, shown in dotted line, to the main guide 78 and auxiliary guide 79, respectively, of polarization coupler 81.

Polarization coupler 75 provides coupling for wave energy at the frequency $f_1$. As shown, the axis of its main guide section is in the $y'$ direction, while the axis of its auxiliary guide section is in the $z'$ direction. As with the other devices previously described, coupler 75 is a reciprocal device having a coupling characteristic which can be described in terms of its three ports 82, 25 and 83. More particularly, energy at the frequency $f_1$ which enters ports 82 and 83 polarized in the $z'$ and $x'$ directions, respectively, is directed to port 25 of the coupler. It should be noted that port 25 of coupler 75 is also an energy coupling port of network 22. As indicated previously, it couples energy to and from the wavepath 28.

Polarization coupler 81 is similar to coupler 75 except that coupler 81 provides coupling for wave energy at frequency $f_2$. As illustrated, the axis of the main and auxiliary guide sections of coupler 81 are in the $x'$ and $y'$ directions, respectively. The reciprocal coupling characteristic of coupler 81 can be described in terms of its three ports 84, 24 and 85. In particular, wave energy at the frequency $f_2$ which enters port 24 polarized in the $y'$ direction traverses through main guide 78 and exits the coupler via port 84. Energy at the same frequency but polarized in the $z'$ direction which enters port 24 is coupled from the main guide to the auxiliary guide, leaving the coupler through port 85. Port 24, as already noted, is also an energy coupling port of network 22. It couples energy to and from its associated wavepath 27.

Typically, both coupler 75 and coupler 81 can be of the type described in U.S. Pat. No. 2,961,618 issued on Nov. 22, 1960, to the applicant hereof.

Prior to discussing the operation of network 22, certain facts regarding such operation which will simplify the discussion will be presented. As pointed out previously, all waves of a given frequency, regardless of their polarizations proceed through network 22 in an analogous manner. As a result, when describing the flow of different frequency waves through the network of FIG. 3 only a single wave at each different frequency need be considered. Moreover, as also previously noted, network 22 is a reciprocal device. Thus, waves coupled between the common wave energy path and any one of the output wave energy paths proceed through network in the same manner regardless of whether they originated at the common path or the output path. As a result, examination of the flow of different frequency waves through network 22 can be discussed in a simplified fashion by assuming all the different frequency wave originate along the common path.

In FIG. 3, waves $E_1$ and $E_2$ propagate along wave path 26 and enter network 22 at a port 23 of coupler 41. The wave $E_1$ is assumed to be at a frequency $f_1$ and, thus, it flows through network 22 in an analogous manner as the orthogonally polarized waves $E_{R1}$ and $E_{R2}$ of FIG. 2. The wave $E_2$, on the other hand, is assumed to be at a frequency $f_2$. Hence, it flows through network 22 in an analogous fashion to the orthogonally polarized waves $E_{T1}$ and $E_{T2}$ of FIG. 2. It should be pointed out, however, that the direction of flow of $E_2$ will be opposite to that of $E_{T1}$ and $E_{T2}$, since the latter waves, as shown in FIG. 2, orginate along path 27 and not along common wave path 26.

The waves $E_1$ and $E_2$ are polarized at arbitrary angles $\theta_1'$ and $\theta_2'$respectively, relative to the $z'$ coordinate direction. Thus, each wave can be resolved into two components, one along the $x'$ direction and the other along the $z'$ direction. The components of $E_1$ are illustrated as $E_{1x}'$, and $E_{1z}$, while those of $E_2$ appear as $E_{2x}'$ and $E_{2z}'$.

The components of waves $E_1$ and $E_2$ along the $x'$ direction $E_{1x}'$ and $E_{2x}'$, upon introduction into port 23, are coupled through main guide 42 and into guide 46 via port 44. Transition guide 46 guides $E_{1x}'$ and $E_{2x}'$ to port 55 of branching network 51. Since $E_{1x}'$ is at the frequency $f_1$, it is coupled to guide 53 of network 51 and departs therefrom polarized in the $z'$ direction, via port 57. Transition guide 63 then directs $E_{1x}'$ to waveguide bend 67 which bends the energy up through transition region 71 to port 83 of coupler 75. $E_{1x}'$ enters the latter port polarized in the $x'$ direction, as a result of the previous bending action of guide 67. Thus, this component is coupled from auxiliary guide 73 to main guide 74 and out therefrom via port 25.

The $E_{2x}'$ component, on the other hand, being at a frequency $f_2$, is coupled straight through main guide 48 of network 51 to transition guide 62. The latter guide couples $E_{2x}'$ to wave guide bend 66, which in turn, couples component $E_{2x}'$ to transition guide 76 polarized in the $y'$ direction. From guide 76, $E_{2x}'$ enters port 84 of coupler 81. Since $E_{2x}'$ is now polarized in the $y'$ direction, it passes straight through guide 78 of coupler 81 and exits therefrom via port 24.

Having followed the transmission of the $E_{1x}'$ and $E_{2x}'$ components through network 22, let us now turn our attention to the $z'$ components of $E_1$ and $E_2$. $E_{1x}'$ and $E_{2x}'$. These components upon entering coupler 41 are coupled from the main guide 42 to auxiliary guide 43. From the latter guide each follows a similar type path as was followed by its corresponding component in the $x'$ direction. More particularly, $E_{1z}'$ and $E_{2z}'$ each pass through transition guide 47 to branching network 52. Since $E_{1z}'$ is at a frequency $f_1$, it is coupled out of the latter network polarized in the $y'$ direction, via auxiliary guide 54, passes through transition guide 64 and waveguide bend 68 and is coupled through transition guide 72, polarized in the $z'$ direction, to port 82 of coupler 75. Since $E_{1z}'$ is polarized in the $z'$ direction, it passes directly through main guide 74 and exits therefrom through port 25.

$E_{2z}'$ on the other hand, since it is at a frequency $f_2$, passes directly through main guide 49 of coupler 52. From the latter guide, it is coupled through transition guide 65, waveguide bend 69 and transition guide 77 to port 85 of coupler 81. Since $E_{2z}'$ is polarized in the $z'$ direction, it is coupled out of coupler 81 via port 24 of main guide 78.

Leaving, respectively, port 25 along path 28 and port 24 along path 27 are the components of $E_1$ and $E_2$ which entered network 22 along path 26. In accordance with the invention, the distance traveled through network 22 by $E_{1x}'$ is selected to be equal to the distance traveled therethrough by $E_{1z}'$ and, likewise, the distance traveled by $E_{2x}'$ is chosen to be equal to the distance traveled by $E_{2z}'$. Thus, the $E_{1x}'$ and $E_{1z}'$ and the $E_{2x}'$ and $E_{2z}'$ components have the same phase relationships upon leaving network 22 as they had when entering the network. As a result, $E_{1x}'$ and $E_{1z}'$ vectorally sum to the same resultant $E_1$ along path 28 and, similarly, $E_{2x}'$ and $E_{2z}'$ vectorally sum to the same resultant $E_2$ along path 27. Thus, network 22 has successfully branched the arbitrarily polarized different frequency waves $E_1$ and $E_2$ from common path 26 to different output paths 27 and 28.

It is important to note that while the embodiment of FIG. 3 has been disclosed in terms of specific polarization couplers and branching networks, the present invention is not intended to be limited to the use of the specified devices. Any conventional couplers and branching networks exhibiting coupling characteristics analogous to those of the devices disclosed can also be employed.

One other point to note is that although the above discussion concerned itself with the transmission through network 22 of waves having single frequencies, the network was not intended to be limited to single frequency waves. In actual practice, the different waves applied to the network might comprise different, widely spaced bands of frequencies, such as, for example, waves comprising bands of frequencies which are within the 4 and 6 GHz common carrier bands.

In all cases, it is understood that the abovedescribed arrangements are simply illustrative of some of the many possible specific embodiments which represent applications of the present invention. Numerous and varied other arrangements can readily be devised without departing from the spirit and scope of the invention. Thus, for example, the embodiment of FIG. 3 can be readily modified to branch a plurality of different frequency waves by disposing, in an analogous manner as illustrated in the figure, two frequency selective branching networks and one polarization coupler for each additional wave.

What is claimed is:

1. A network for coupling electromagnetic wave energy including different signals in each of two frequency bands between separate wave paths respectively for each of said signals and a combined wave path supporting both of said signals, said signals being of arbitrary polarization in each of said paths, said network including polarization selective means associated with each of said paths for coupling between waves of arbitrary polarization therein and a pair of orthogonal components together being equivalent to said arbitrary polarization, and frequency selective means discriminating between said signals for separately processing each one of said orthogonal components to provide unique coupling paths for each of said signals in that one component between said polarization selective means associated with said combined signal path and the respective polarization selective means of said separate paths.

2. The network according to claim 1 wherein said frequency selective means includes a pair of filter means one for each orthogonal component for reflecting one of said signals and passing the other, each of said filters having in combination therewith a branching circuit for coupling said reflected signal between said combined wave path and one of said separate wave paths.

3. Network apparatus for coupling arbitrarily polarized waves of different, widely spaced frequencies from a common wave energy path to different output wave energy paths and vice versa, comprising:

first and second wave energy paths;

means for coupling the component of each of said waves polarized in a first direction from said common path to said first path and for coupling the component of each of said waves polarized in a second direction, orthogonal to said first direction, from said common path to said second path;

and means for coupling the wave components of the same frequency traversing said first and second paths to the same output path.

4. Network apparatus for coupling arbitrarily polarized waves of different, widely spaced frequencies from a common wave energy path to different output wave energy paths and vice versa, comprising first and second wave energy paths;

an ultrawideband polarization coupler for coupling the component of each of said waves polarized in a first direction from said common path to said first path and for coupling the component of each of said waves polarized in a second direction, orthogonal to said first direction, from said common path to said second path;

third and fourth pluralities of wave energy paths;

a first plurality of frequency selective branching networks, each of said first networks serving to branch a different one of the wave components traversing said first path to a different one of said third paths;

a second plurality of frequency selective branching networks, each of said second networks serving to branch a different one of the wave components traversing said second path to a different one of said fourth paths;

and a plurality of polarization coupling devices, each of said coupling devices receiving the wave component traversing a different one of said third paths and the wave component traversing a different one of said fourth paths and coupling the two received wave components to a different one of said output paths, said third and fourth paths associated with a particular one of said coupling devices being those along which component waves of the same frequency are propagating.

5. Network apparatus in accordance with claim 4 in which the distance traveled therethrough by wave components of the same frequency is the same.

6. Network apparatus in accordance with claim 4 in which each of said waves traversing said common wave path is orthogonally polarized.

7. Network apparatus in accordance with claim 4 wherein said ultrawideband polarization coupler, said first and second pluralities of frequency selective branching networks and said coupling devices are reciprocal devices.

8. Network apparatus in accordance with claim 7 in which wave energy is introduced into said network apparatus via at least one of said output paths.

9. Network apparatus in accordance with claim 8 in which arbitrarily polarized wave energy having a frequency associated with a given output path is introduced into said network apparatus via said given output path and is coupled by said network apparatus to said common path.

10. Network apparatus in accordance with claim 4 which includes, in addition, a plurality of polarization rotators, each of which serving to rotate the polarizations of the waves coupled to a different one of said output paths.

11. A frequency selective polarization insensitive branching network comprising:

an ultrawideband polarization coupler including a first main waveguide section having first and second ports and a first auxiliary waveguide section, joined to said first main guide section, having a third port, said ultrawideband coupler having a reciprocal coupling characteristic whereby waves of first and second widely spaced frequencies polarized in a first direction are coupled between said first and second ports and waves of said first and second frequencies polarized in a second direction, orthogonal to said first direction, are coupled between said first and third ports;

a first frequency selective branching network comprising a second main waveguide section having fourth and fifth ports and a second auxiliary waveguide section, joined to said second main guide, having a sixth port, said first network having a reciprocal branching characteristic whereby waves of said first frequency polarized in said first direction are branched from said fourth port to said sixth port, while experiencing a 90° rotation in polarization, and waves of all other frequencies are coupled from said fourth port to said fifth port;

waveguide means for coupling said second and fourth ports;

a second frequency selective branching network including a third main waveguide section having seventh and eighth ports and a third auxiliary waveguide section, joined to said third waveguide, having a ninth port, said second network having a reciprocal branching characteristic whereby waves of said first frequency polarized in said second direction are branched from said seventh port to said ninth port, while experiencing a 90° rotation in polarization, and waves of all other frequencies are coupled from said seventh port to said eighth port;

waveguide means for coupling said third and seventh ports;

a first polarization coupler comprising a courth main waveguide section having tenth and eleventh ports and a fourth auxiliary waveguide section joined to said fourth main guide, having a twelfth port, said first coupler having a reciprocal coupling characteristic whereby waves of said first frequency polarized in a third direction are coupled between said tenth and eleventh ports and waves of said first frequency polarized in a fourth direction, orthogonal to said third direction, are coupled between said eleventh and twelfth ports;

waveguide band means for coupling said sixth and twelfth ports;

waveguide bend means for coupling said ninth and tenth ports;

a second polarization coupler including a fiFth main waveguide section having thirteenth and fourteenth ports and a fifth auxiliary waveguide section, joined to said fifth main guide, having a fifteenth port, said second coupler having a reciprocal coupling characteristic whereby waves of said second frequency polarized in a fifth direction are coupled between said thirteenth and fourteenth ports and waves of said second frequency polarized in a sixth direction, orthogonal to said fifth direction, are coupled between said thirteenth and fifteenth ports;

waveguide bend means for coupling said fifth and fourteenth ports;

and waveguide bend means for coupling said eighth and fifteenth ports.

12. A branching network in accordance with claim 11 in which said third and sixth directions are the same as said second direction and said fourth direction is the same as said first direction.

13. A branching network in accordance with claim 11 in which the path from said first port to said eleventh port, through said first branching network, is equal in length to the path from said first port to said eleventh port, through said second branching network, and the path from said first port to said thirteenth port, through said first branching network, is equal in length to the path from said first port to said thirteenth port, through said second branching network.

14. An antenna feed system for compensating for the Faraday rotation experienced by a pair of orthogonally polarized received waves, at a frequency $f_1$, received by a ground station antenna and a pair of orthogonally polarized transmitted waves, at a frequency $f_2$, transmitted from said antenna comprising:

a common wave energy path for coupling said transmitted and received waves respectively, to and from said antenna;

a first wave energy path along which traverses said received waves;

a second wave energy along which traverses said transmitted waves;

a frequency selective polarization insensitive branching network for branching said received waves from said common path to said first path and said transmitted waves from said second path to said common path;

a first polarization rotator disposed along said first path for rotating the polarizations of said received waves such that the Faraday rotation experienced by said received waves during transmission is substantially cancelled;

and a second polarization rotator disposed along said second path for pre-rotating the polarizations of said transmitted waves such that the Faraday rotation experienced by said transmitted waves during transmission is substantially cancelled.

15. A feed system in accordance with claim 14 in which the frequency $f_1$ is within the 4 GHz common carrier band and in which the frequency $f_2$ is within the 6 GHz common carrier band.

* * * * *

UNITED STATES PATENT OFFICE
CERTIFICATE OF CORRECTION

Patent No. 3,768,039 Dated October 23, 1973

Inventor(s) Edward Allen Ohm

It is certified that error appears in the above-identified patent and that said Letters Patent are hereby corrected as shown below:

Column 1, line 67, "transverse" should be --traverse--.
" 2, "
" ", "
" ", " 28, "branches" should be --branched--.
" 3, " 38, "transverse" should be --traverse--.
" 4, " 6, "transverse" should be --traverse--.
" 4, " 21, "present" should be --presented--.
" 4, " 44, "2" should be --z--.
" 4, " 64, "Analagously" should be --Analogously--.
" 7, " 10, "from" should be --form--.
" 7, " 68, "wave" should be --waves--.
" 8, " 48, "$E_{1x}$'" should be --$E_{1z}$'--.
" 8, " 49, "$E_{2x}$'" should be --$E_{2z}$'--.
" 11, " 52, "courth" should be --fourth--.

Signed and sealed this 10th day of September 1974.

(SEAL)
Attest:

McCOY M. GIBSON, JR.
Attesting Officer

C. MARSHALL DANN
Commissioner of Patents

M PO-1050 (10-69)

USCOMM-DC 60376-P69
★ U.S. GOVERNMENT PRINTING OFFICE : 1969 O—366-334.